(12) United States Patent
Kravcik

(10) Patent No.: US 10,073,893 B2
(45) Date of Patent: Sep. 11, 2018

(54) INTERNET AND DATABASE MINING TO GENERATE DATABASE RECORDS

(71) Applicant: Hal Kravcik, Spooner, WI (US)

(72) Inventor: Hal Kravcik, Spooner, WI (US)

(*) Notice: Subject to any disclaimer, the term of this patent is extended or adjusted under 35 U.S.C. 154(b) by 76 days.

(21) Appl. No.: 14/811,196

(22) Filed: Jul. 28, 2015

(65) Prior Publication Data

US 2015/0331915 A1 Nov. 19, 2015

Related U.S. Application Data

(63) Continuation of application No. 14/092,617, filed on Nov. 27, 2013, now Pat. No. 9,122,728, which is a continuation of application No. 12/234,029, filed on Sep. 19, 2008, now Pat. No. 8,600,966.

(60) Provisional application No. 60/973,990, filed on Sep. 20, 2007.

(51) Int. Cl.
  *G06F 17/30* (2006.01)
  *G06F 7/24* (2006.01)
  *G06Q 30/02* (2012.01)

(52) U.S. Cl.
  CPC .......... *G06F 17/30539* (2013.01); *G06F 7/24* (2013.01); *G06F 17/30156* (2013.01); *G06F 17/30377* (2013.01); *G06F 17/30864* (2013.01); *G06Q 30/02* (2013.01); *G06F 2216/03* (2013.01)

(58) Field of Classification Search
  CPC ................ G06F 17/30864; G06F 17/30539
  USPC ......................................... 707/692, 754, 706
  See application file for complete search history.

(56) References Cited

U.S. PATENT DOCUMENTS

| | | | | |
|---|---|---|---|---|
| 5,497,486 A | * | 3/1996 | Stolfo ....................... | G06F 7/14 707/723 |
| 5,717,915 A | * | 2/1998 | Stolfo ....................... | G06F 7/14 707/723 |
| 5,924,090 A | * | 7/1999 | Krellenstein ..... | G06F 17/30696 707/705 |
| 6,026,398 A | * | 2/2000 | Brown .............. | G06F 17/30622 707/745 |
| 6,493,703 B1 | * | 12/2002 | Knight .............. | G06F 17/30702 707/669 |
| 7,031,958 B2 | * | 4/2006 | Santosuosso ..... | G06F 17/30463 707/669 |
| 7,640,236 B1 | * | 12/2009 | Pogue ............... | G06F 17/30867 707/669 |
| 2003/0055831 A1 | * | 3/2003 | Ryan .................. | G06F 17/3061 707/802 |
| 2003/0167259 A1 | * | 9/2003 | Casson ................ | C09D 11/037 707/669 |
| 2004/0064444 A1 | * | 4/2004 | Villaret ............. | G06F 17/30982 707/669 |
| 2004/0267595 A1 | * | 12/2004 | Woodings .............. | G06Q 10/06 705/7.14 |

* cited by examiner

*Primary Examiner* — Shahid Alam
(74) *Attorney, Agent, or Firm* — Dorsey & Whitney LLP

(57) ABSTRACT

A method of generating database records. The method includes receiving by a processor, a user input defining a common search criteria; identifying, by the processor, one or more database records in a searchable database, wherein each of the one or more records is associated with the common search criteria; and extracting by the processor, the one or more database records from the searchable database to build a set of extracted records, wherein the extracted records are in a different format from the database records.

13 Claims, 11 Drawing Sheets

| pCode | Latitude | Longitude | Population | Density | < Housing U | Land Area | Water Area | 9th Grade | Never Marri | High School | Married |
|---|---|---|---|---|---|---|---|---|---|---|---|
| 77036 | 29.70053 | -95.535142 | 76146 | 10023.08 | 30372 | 7.6.. | 0 | 19.1 | 35.4 | 16 | 47.9 |
| 75243 | 32.912225 | -96.736895 | 59551 | 6643.23 | 29093 | 8.96.. | 0 | 5 | 36.7 | 8.5 | 42.4 |
| 75287 | 32.999786 | -96.844364 | 45291 | 7889.51 | 26681 | 5.74.. | 0 | 1.7 | 41.5 | 3.2 | 40.3 |
| 75228 | 32.825227 | -96.67955 | 65689 | 5860.7 | 25400 | 11.21.. | 0 | 11.9 | 30 | 16.4 | 48.8 |
| 75231 | 32.874317 | -96.747648 | 52329 | 10074.76 | 24035 | 5.19.. | 0 | 13.9 | 40.4 | 15.3 | 41.7 |
| 72032 | 35.075467 | -92.434014 | 59262 | 349.91 | 23697 | 163.37.. | 2.12.. | 4.4 | 28.5 | 11 | 55.5 |
| 77084 | 29.839155 | -95.663915 | 63557 | 1667.28 | 23123 | 38.12.. | 0 | 4.7 | 24 | 9.2 | 61.3 |
| 75240 | 32.938774 | -96.785437 | 50003 | 6770.23 | 22977 | 7.39.. | 0 | 13.4 | 38.1 | 10.4 | 45.2 |
| 77057 | 29.745129 | -95.491318 | 35491 | 8055.56 | 22517 | 4.41.. | 0 | 5.6 | 41.2 | 4.2 | 39.3 |
| 70117 | 29.970404 | -90.030367 | 51252 | 8122 | 22469 | 6.31.. | 0.1.. | 10.7 | 42.1 | 27.6 | 29.2 |
| 75150 | 32.818392 | -96.633558 | 55400 | 4441.83 | 22408 | 12.47.. | 0.01.. | 4.4 | 25.7 | 11.2 | 54.4 |
| 76116 | 32.72228 | -97.444097 | 45343 | 3463.45 | 22226 | 13.09.. | 0.02.. | 5.9 | 26.6 | 10.5 | 48.1 |
| 78250 | 29.510204 | -98.667844 | 66601 | 4924.22 | 22197 | 13.53.. | 0 | 2.3 | 22.5 | 4.7 | 64 |
| 75206 | 32.826128 | -96.7712 | 39738 | 9281.4 | 22102 | 4.28.. | 0.01.. | 13.6 | 49.2 | 8.6 | 35.1 |
| 77077 | 29.750897 | -95.612554 | 42416 | 4376.61 | 21985 | 9.69.. | 0 | 1.8 | 27.3 | 3.3 | 53.8 |
| 75217 | 32.72238 | -96.675823 | 72897 | 2480.73 | 21654 | 29.39.. | 0.76.. | 24.9 | 31.4 | 23.7 | 49 |
| 70119 | 29.974504 | -90.087472 | 50175 | 10031.9 | 21307 | 5.. | 0.01.. | 11.2 | 45.7 | 25.4 | 27.9 |
| 76180 | 32.855666 | -97.218184 | 54195 | 3036.13 | 21081 | 17.85.. | 0.02.. | 3 | 21.8 | 6.6 | 60.7 |
| 72401 | 35.844795 | -90.684432 | 47422 | 402.26 | 21035 | 117.89.. | 1.18.. | 8.6 | 26.4 | 14 | 52.7 |
| 70115 | 29.927305 | -90.101972 | 40287 | 10546.94 | 20990 | 3.82.. | 0 | 6.9 | 45.3 | 14.6 | 32.2 |
| 75067 | 33.020118 | -97.007718 | 49378 | 3811.64 | 20981 | 12.95.. | 0.01.. | 5 | 29.1 | 7.3 | 54.9 |
| 70065 | 30.022853 | -90.251336 | 53623 | 6462.29 | 20952 | 8.3.. | 0 | 5.9 | 27.6 | 12 | 54.5 |
| 75043 | 32.854893 | -96.602118 | 53343 | 3771.56 | 20501 | 14.14.. | 0 | 3.7 | 24 | 8.5 | 56.7 |
| 77042 | 29.741565 | -95.559963 | 36282 | 5857.02 | 20237 | 6.19.. | 0 | 3.2 | 34.1 | 5.8 | 46.8 |
| 71913 | 34.47056 | -93.08805 | 37091 | 278.49 | 20227 | 133.18.. | 1.3.. | 5.9 | 15.9 | 14.7 | 58.1 |
| 78240 | 29.518413 | -98.60869 | 44281 | 4142.57 | 20098 | 10.69.. | 0 | 2.7 | 33.6 | 5.8 | 45.9 |
| 70072 | 29.869283 | -90.109331 | 57639 | 1459.5 | 20067 | 39.49.. | 0.01.. | 10.1 | 27.2 | 18.8 | 53.1 |
| 75211 | 32.736931 | -96.882531 | 68693 | 4020.57 | 19765 | 17.09.. | 0.05.. | 33.6 | 32.2 | 23.3 | 51.6 |
| 78209 | 29.48618 | -98.456809 | 40675 | 3855.23 | 19686 | 10.55.. | 0 | 3.7 | 24.2 | 5.7 | 50.3 |
| 70001 | 29.984096 | -90.169024 | 39774 | 6421.26 | 19600 | 6.19.. | 0 | 4.2 | 29.2 | 10.3 | 46.5 |
| 76010 | 32.723382 | -97.084981 | 53757 | 5754.87 | 19529 | 9.34.. | 0 | 17.9 | 32.8 | 18.1 | 48.4 |
| 76201 | 33.226598 | -97.130616 | 48808 | 3840.53 | 19518 | 12.71.. | 0.04.. | 7.8 | 44.8 | 10.2 | 41 |
| 75052 | 32.675604 | -97.023462 | 56252 | 2294.67 | 19496 | 24.51.. | 0 | 4.3 | 24.1 | 10.3 | 61.9 |
| 75061 | 32.826729 | -96.961408 | 53184 | 4060.22 | 19417 | 13.1.. | 0.01.. | 19.5 | 29.9 | 15.2 | 51.7 |
| 75149 | 32.767329 | -96.607598 | 54693 | 3247.08 | 19409 | 16.84.. | 0.04.. | 6.1 | 22.9 | 15.1 | 57.2 |

INTERNET AND DATABASE MINING TO GENERATE DATABASE RECORDS

CROSS-REFERENCE TO RELATED APPLICATIONS

This application is a continuation of U.S. patent application Ser. No. 14/092,617, filed Nov. 27, 2013, now U.S. Pat. No. 9,122,728, which is a continuation of U.S. patent application Ser. No. 12/234,029, filed Sep. 19, 2008, now issued as U.S. Pat. No. 8,600,966 on Dec. 3, 2013, which claims priority to U.S. Patent Application No. 60/973,990, filed on Sep. 20, 2007, the entire contents of which are incorporated herein by reference.

FIELD OF THE INVENTION

The present invention relates to data mining of searchable Internet databases. In particular, the present invention relates accessing target data by searching a record set having common criteria associated with each record in the set.

BACKGROUND

Data available on the Internet is searchable using various search engines. However, search result data may not be useful in the form presented or may only be useful after the user manually retrieves the data by copying and pasting the information or by manually typing the data into another document.

Using the Internet to identify people, places or businesses in a specific geographical location is difficult because search strings entered in search engines typically result in a myriad of data being presented to the user, some of which may not be useful. For example, searching for a company having a common address may result in retrieval of data for multiple companies having the common address. In addition, searching for a person or business in a specific geographical location may yield results for persons or businesses in the geographical area as well as outside of the location of interest. For each of these search results the user is required to sort through a large volume of information to identify useful information.

In addition, generating lists of people, places or businesses in a particular locale using the Internet as a search tool is labor intensive because each list entry needs to be entered by the user, which may involve various data manipulation functions such as manual copying and pasting, typing, parsing, and/or formatting. As a result, those desiring to generate a list of people and/or businesses in a certain location have resorted to manual entry of phone listings from printed phone books. When places, e.g., properties, are to be identified, a user is required to enter property search criteria one-by-one.

Accordingly, there is a need for a system and method capable of generating lists of relevant information for people, places and for businesses within a geographical area.

SUMMARY

Various embodiments of the invention address the issues described above by providing an automated system and method for mining text data related to businesses and/or consumers and/or places by publicly available information on the Internet.

According to one embodiment, a method for automatically acquiring a set of data includes opening a searchable Internet database; initiating an automated timed search of each one of a plurality of records, where for each record in the plurality of records, a portion of the record comprises common criteria with the other records; retrieving information associated with the searched record; and providing the retrieved information in a desired format.

In another embodiment, an application programming interface allowing user control includes processes for generating a record set of search criteria, each record in the set comprising a portion of common criteria; automatically executing in a searchable Internet database a search of each record in the record set; and identifying and retrieving search results for each record searched.

In yet another embodiment, a method of generating database records is disclosed. The method includes receiving by a processor, a user input defining a common search criteria; identifying, by the processor, one or more database records in a searchable database, wherein each of the one or more records is associated with the common search criteria; and extracting by the processor, the one or more database records from the searchable database to build a set of extracted records, wherein the extracted records are in a different format from the database records.

In another embodiment, a method of removing duplicate entries from a database is disclosed. The method includes generating a database having a set of records, wherein a first portion of each record comprises a common criteria data within the set of records to be searched and a second portion of each record is generated based on the common criteria data; appending a new record to the set of records, the new record comprising the first portion comprising the common criteria data and a third portion generated based on the common criteria data; and comparing the new record to each record in the set of records to determine whether the third portion of the new record matches the second portion of a record in the set of records.

In still another embodiment, a method of conducting timed searches of data is disclosed. The method includes executing, by a processor, a first timed search of a set of records having common search criteria; executing, by the processor, a second timed search of the set of records; wherein a time period between the first timed search and the second timed search is randomly selected; retrieving information associated with the searched plurality of records; and providing the retrieved information in a specified format.

These and other features and advantages of aspects of the present invention will become apparent to those skilled in the art from the following detailed description, where it is shown and described illustrative embodiments, including best modes contemplated for carrying out the invention. As it will be realized, the various aspects of the invention are capable of modifications in various obvious respects, all without departing from the spirit and scope of the present invention. Accordingly, the drawings and detailed description are to be regarded as illustrative in nature and not restrictive.

BRIEF DESCRIPTION OF THE DRAWINGS

FIG. 3B depicts a set of census data collected using the method of FIG. 3A.

FIG. 6 depicts a screenshot of an import and append data tool.

DETAILED DESCRIPTION

Data mining methods, in particular, text mining methods of the present invention, involve accessing data in an automated fashion using one or more processes that acquire target information and present the target information in a specified format. Text mining methods of the present invention may be performed in Internet and/or database applications and may be used to automatically generate data sets related to consumers and/or businesses. In certain embodiments, publicly available information on the Internet may be retrieved and organized into databases, and the data may be manipulated using extended database capabilities, cross-referenced using stored data or by query, supplemented, and/or appended to other data. Furthermore, the present invention may cut down on computing cycles needed server side by providing a client side data access and collection tool. Embodiments of the present invention are described further with reference to the figures.

Figure 1:
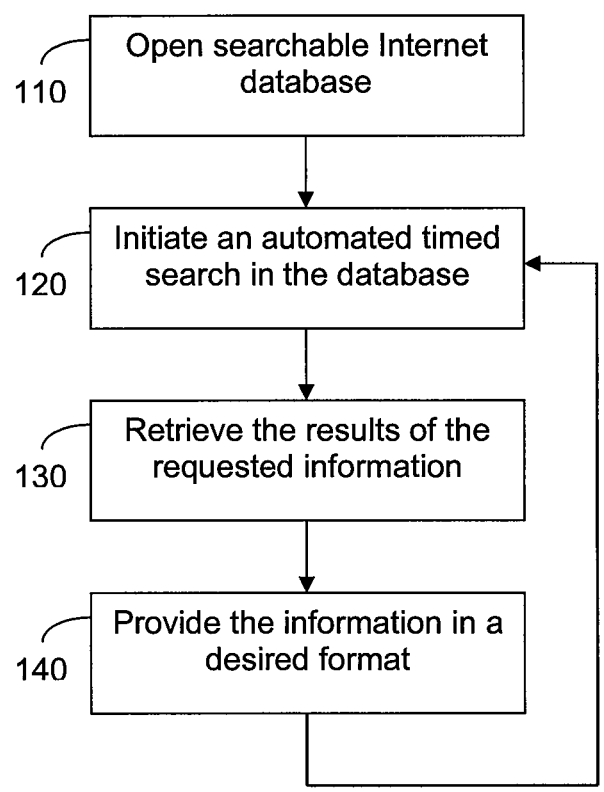
FIG. 1 depicts a flowchart of a method for acquiring a set of data.

FIG. 1 depicts a flowchart of a method for acquiring a set of data according to certain embodiments of the present invention. According to FIG. 1, a database with search capabilities is opened (110), an automated timed search of a set of data is initiated (120), information associated with the set of data is retrieved (130) in a user control, and the information is provided (140) in a desired format.

Databases available over the Internet that may be opened (110), for example, using an application programming interface (API). The databases may include: Google, Yahoo, Yahoo people search, Switchboard.com, Dexonline.com, WhitePages.com and/or other search engines. In addition, public information available through city, county, state, or national databases/websites may be opened (110). For example, a department of motor vehicles database may be opened and used as a source of information for automatically generating a set of data, such as a data set related to the type of car registered to a consumer, and the value of the car. According to some implementations, other searchable databases in addition to or as an alternative to searchable Internet databases may be queried. For example, intranet or internal databases may be queried alone or concurrently with other databases including searchable Internet databases.

The initiated (120) automated timed database search may be for a set of data having various types of common criteria. For example, a set of public records may be searched using a common data point such as public record prefix numbers, e.g., pppxxxx, where "ppp" is a string of prefix characters specified by a user, e.g., 0 to 9, A to Z or other keyboard characters (~, !, +, ^, *), and "xxxx" is any number of characters following the prefix generated automatically, according to certain embodiments, where an API automatically builds a set of records based off of the user-entered common criteria. In another example, prefix, suffix, or a group of characters within a set of records may be the common criteria specified by a user for a group of records to be searched. In one particular example, when an automated timed search is initiated (120) for land parcel IDs having a 10-digit code, the first digits, middle digits or last digits may be used as the user specified search criteria, and all 10-digit numbers having that segment of digits will be queried. Land parcel IDs corresponding to the queried 10-digit numbers may be identified, if available, along with the public record associated with the land parcel ID. In another example, 1-800 phone numbers, or the like, may be searched by entering a 1-800 prefix as the common criteria so that a record of valid 1-800 numbers may be constructed. In a further example, a department of motor vehicles database may be opened and the common criteria searched may be a state and zip code, which results in providing a set of data that may include the name, address, and vehicle information for a consumer, such type of car registered to the consumer and the value of the car.

From the initiated (120) search, the search results encountered may be retrieved (130) and saved, for example, as a file, line of text, or set of data associated with the corresponding search. Retrieving data may involve the algorithm collecting data associated with the searched and located criteria. For example, once the searched for "pppxxxx" is found on a database, the algorithm collects information associated with "pppxxxx," e.g., name and address. In certain embodiments, the algorithm involves the use of artificial intelligence that isolates the syntax searched, and by identifying this defined type of information, the algorithm is able to move through the set of retrieved data and collect other relevant information, separate/identify the information, and provide the information in an organized form. In a particular embodiment, the algorithm isolates the syntax from the search results and identifies and collects data by shuttling forward or backward from the isolated syntax in the search result, e.g., shuttles forwards or backwards from "pppxxxx" in the results page. For example, the algorithm may move stepwise up to and/or past other data points in order to isolate relevant data associated with "pppxxxx." The algorithm may be further configured to discern what relevant items are in the result, e.g., discerns that the data is a first name, a last name, an address, a state, and/or a zip code associated with "pppxxxx," and retrieves all or a portion of the data.

One to multiple sets of data retrieved (130) from the search may be provided (140) according to user preferences. For example, retrieved data may be presented in a software application, such as an API, where the data may be isolated, identified, parsed, manipulated and/or organized in a variety of ways. In a particular example, multiple sets of retrieved data may be presented in a uniform fashion so that each set of data appears in the same format as the other sets.

In certain configurations, retrieved data may be cross-referenced for authentication, validation, retrieving additional related data, or other purposes. Retrieved data may be compared with data stored on a pre-existing database, on another Internet search database, or other suitable database configured for providing the proper information. Data retrieved according to some implementations of the invention may be used as search criteria for query in another database to verify that the data is current and/or accurate. Retrieved data may be queried against data from a list, e.g., do not call list (described further below), to determine if the information is suitable for a marketing list. Furthermore, retrieved data may be modified or supplemented, for example, by cross-referencing search results with demographic data, and retaining retrieved data that matches the demographic targeted. In another example, retrieved data may be used as a basis for a query so that, for example, where an initial 1-800 query yields a name and phone number, but no address, the name may be queried in one or more databases in order to retrieve address information and supplement the initial 1-800 query results. In yet another example, DMV information may be supplemented, for example, by querying a vehicle type identified for a particular consumer with a blue book value search engine. Moreover, retrieved data may be cross-referenced, for example, against census data. Cross-referencing retrieved data may take place at various points in the above-described method including upon retrieval (130) and/or after the retrieved data is provided (140), and may be an automated, semi-automated, or manual process.

One embodiment that implements the method of FIG. 1 identifies potential customers for direct mail marketing in iterative Internet searches, and data is collected and provided in a mail merge format. Accordingly, a method for identifying potential customers for direct mail marketing is depicted in FIG. 2 and involves: opening (210) an Internet database having a reverse phone number lookup function, initiating (220) an automated timed reverse phone number search, retrieving (230) the data associated with the phone number, and providing (240) data in a desired mailing format.

As discussed in relation to FIG. 1, a variety of databases may be used for identifying and generating data sets. For the FIG. 2 purposes of generating a direct mail marketing list of potential customers, an Internet-based reverse phone number database may be employed by opening (210), e.g., navigating to the website with a query function. However, it will be understood that other databases may be useful in generating data sets including databases internal to a company, and in this case, opening (210) may involve opening a computer application configured for accessing database on internal data stores.

Figure 2:
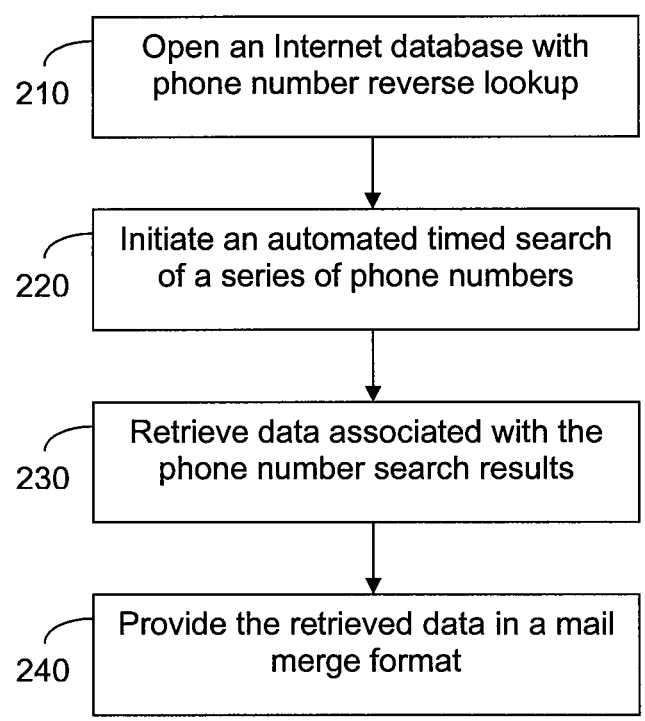
FIG. 2 depicts a flowchart of a method for acquiring consumer and/or business data.

Following the example of FIG. 2, data in the Internet database is queried by initiating (220) an automated timed reverse phone number search of a series of phone numbers having a common criteria, e.g., the same prefix. The timed search may be automatically executed about once every second, ½, ¼, 1/10, 1/100 or 1/5000 second. In some instances, the phone numbers queried will be invalid, e.g., one that is not assigned or that is unlisted, and the query will automatically search a next phone number in the series of numbers.

Once a valid phone number is identified, data associated with the phone number is retrieved (230) in an application programming interface (API), where the data is isolated, parsed and/or organized in a desired way. The retrieval process involves extracting, for example, a first name, last name, cell phone, home phone, street address, city, state, zip code, and/or e-mail address. In certain implementations, the retrieval process involves identifying what the particular piece of data is, e.g., identifying that the data is a first name, and extracting the identified data so that relevant data is retrieved. In a further implementation, a plurality of data types associated with the phone number or with the query may be retrieved.

Subsequently, the data is provided (240) in a mail merge format thus facilitating direct mail marketing efforts. For example, presentation of the text data may be specified by a user, which allows customizable uniform presentation of the data of interest. For example, a portion of the retrieved data may be presented in a label format for printing on a mailing label. In this case, the retrieved data would be presented in three or more lines, the first line including a first name, last name, and title, if any; the second line including a street address and unit number, if any; and the third line including the city, state, and zip code. In another example, the retrieved data may be presented in a phone list so that at least a phone number and the name(s) of the person(s) associated with the phone number are provided in a list format. The text presented may be in a variety of file formats such as: HTML, plain text, Microsoft Word and/or Excel, or Adobe Acrobat.

Some of the above-described processes may be used with a variety of Internet search engines configured to provide access to information when a phone number is entered as the search string, e.g., when the search engine allows reverse lookup of a phone number. Furthermore, according to certain implementations, methods of the present invention are capable of recognizing typical as well as other less typical phone number formats, e.g., where a typical 10-digit phone number has a format of (aaa) ppp-nnnn, where "a" is an area code digit from 0-9, "p" is a prefix digit from 0-9, and "n" is a digit from 0-9, and where non typical formats include aaa-ppp-nnnn, aaappp-nnnn, aaa ppp-nnnn, aaa pppnnnn, and in some instances ppp-nnnn or pppnnnn. As a result, some embodiments of the invention are able to isolate phone number data that is presented in a variety of formats. Furthermore, 1-800 numbers, or the like, may be queried, and these numbers may be search in typical format, e.g., 1-800-999-9999, or less typical formats, 1 (800) 999-9999.

Figure 3A:
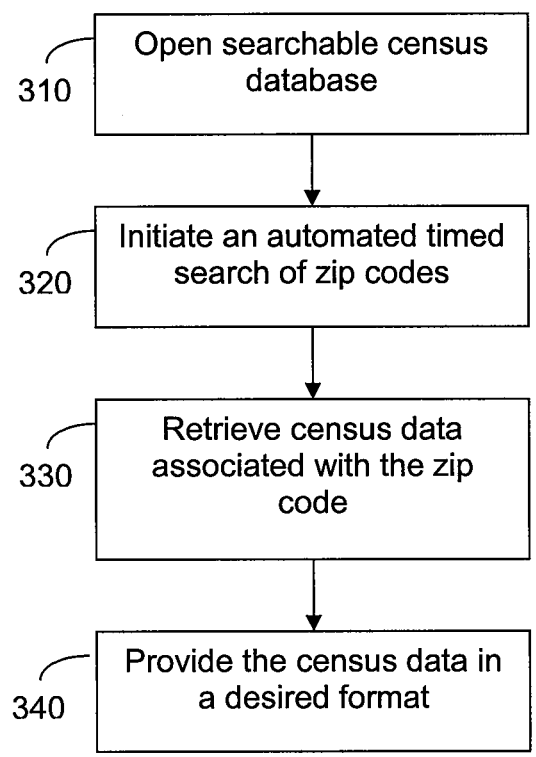
FIG. 3A depicts flowchart of a method for acquiring census data by zip code.

Although consumer and/or business data may be retrieved from the Internet for use in marketing and advertising applications, the methods of the present invention may search publicly available information on the Internet using any a variety of types of common criteria. For example, according to the method depicted in the flowchart of FIG. 3A, census data by zip code is retrieved in a series of iterative searches. According to FIG. 3A, a searchable census records Internet database is opened (310), an automated timed search based on zip code search criteria is initiated (320), census information associated with the requested zip code is retrieved (330) in a user control, and the census data is provided (340) in a desired format. Data may be presented in a grid format such as the grid of FIG. 3B, which includes census data for zip codes beginning with "7." The grid of FIG. 3B includes columns for the zip code searched, latitude, longitude, population, density per square mile, housing, land area, water area, percentage in $9^{th}$ grade, percent never married, percent in high school, and percent married; and is arranged in descending order according to the numbers in the housing column. The data presented in FIG. 3B is an example of the type of data that may be collected and displayed using zip codes as common search criteria. It will be understood that additional or alternative census data may be retrieved using the method of FIG. 3A, and that search criteria other than zip code information may be entered in order to retrieve census data.

Data Mining

Figure 4:
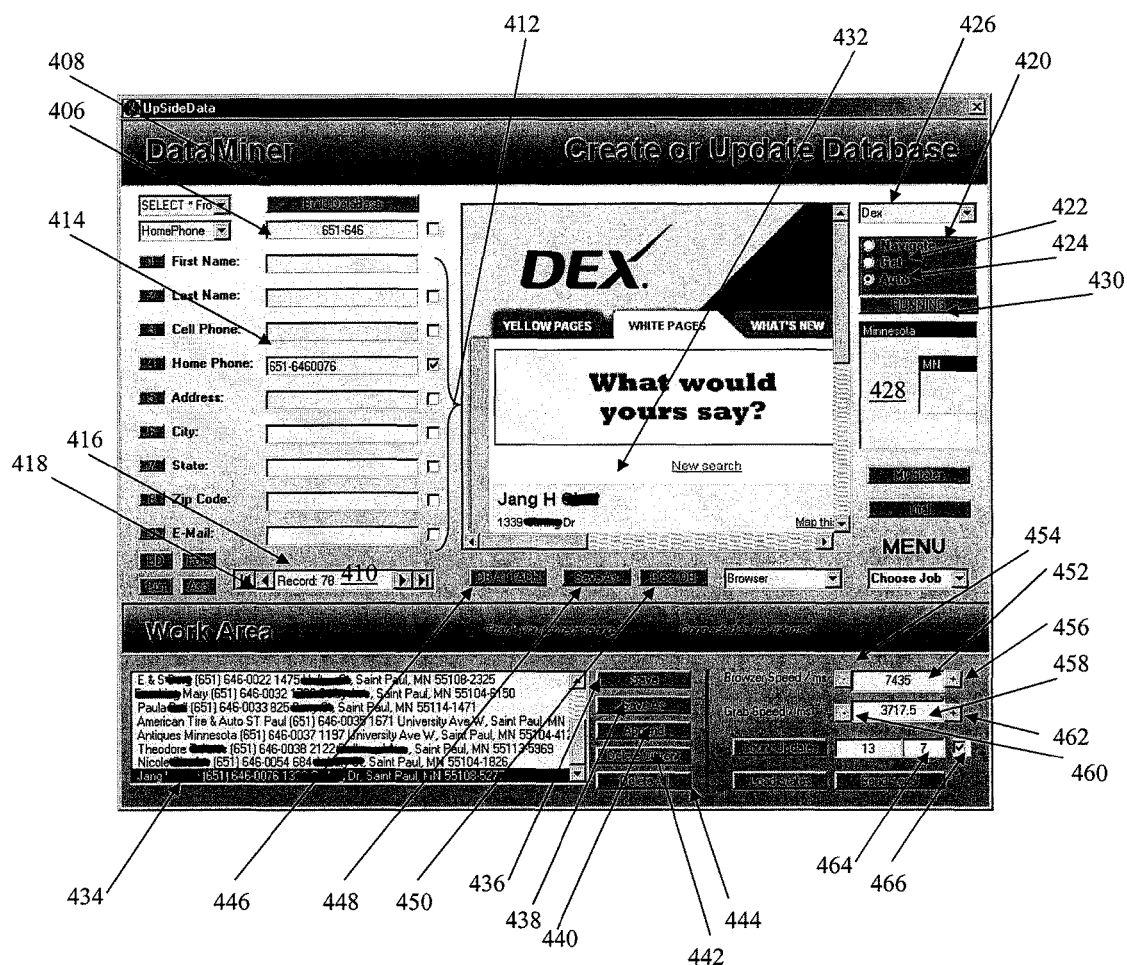
FIG. 4 depicts a screenshot of a database creation page.

The methods and processes of the present invention may be implemented in various hardware and/or software applications. FIG. 4 provides a screenshot of text mining software that allows a user to enter parameters for creating a database of retrieved data. According to FIG. 4, a user may enter a search string in the DB Build & Search field 406 and select the "Build DataBase" button 408. In response, a record set 410 is automatically created, where a record number of the record set 410 may be displayed in record number field 416, and the specific information associated with the record number may be displayed in one or more customer fields 412, e.g. home phone field 414. In addition, the records in the record set 410 may be scrolled through or viewed at the beginning or end of the record set by selecting arrow buttons 418. According to certain embodiments, the record set 410 created may be used as search criteria, and when a user enters a phone number search string of (aaa) ppp-, where "a" is an area code digit 0-9 and "p" is a phone number prefix digit 0-9 of (651) 646-, the software creates a set of records, e.g., up to 10,000 records beginning with (651) 646-0000 and ending with (651) 646-9999. The record set 410 is then used as search criteria.

After record set 410 is created, consumer and/or business data may be retrieved by (1) selecting the "Navigate" 420, "Get" 422, or "Auto" 424 radio buttons, (2) selecting the appropriate search engine at pull down menu 426, e.g., "Dex," (3) selecting the appropriate state in state field 428, and (4) selecting the "Execute" button 430. In this series of steps, once a search engine and state field are selected, a user need not re-select these items each time a search is executed except when the user desires to change the search engine from pull down menu 426 or the state in state field 428. According to some implementations, once the "Execute" button 430 is selected, the method of FIG. 2 is executed so that consumer data is automatically retrieved and presented in a user control in a desired format.

When the "Navigate" radio button 420 is selected in the above steps, the current record's phone number is automatically entered in the search engine, the search is executed, and the results are displayed in search engine window 432. When the "Get" radio button 422 is selected subsequent to the search and the "Execute" button 430 selected, the results are extracted from the search engine results and placed in work area 434.

Alternatively, when the "Auto" radio button 424 is selected, each phone number in record set 410 is entered into the search engine, one at a time, and the results are extracted in work area 434. When a phone number does not have corresponding listing information available, no information is extracted and the next phone number in the record set 410 is searched. When the next phone number record with available listing information is encountered, the information is extracted and provided in work area 434. The iterative process continues until a user chooses to stop the search process, or until the iterative search process reaches the phone number: (651) 646-9999, and extracts and displays available corresponding listing information. From FIG. 4, record number field 416 shows the software-conducted search is on the 78$^{th}$ record which corresponds to (651) 646-0076 (displayed in "Home Phone" field 414), shows search engine results for Jang in the centrally located search engine window 432, and displays the retrieved results in work area 434. Each phone number record may be reviewed in the "Home Phone" field, and the record's number, e.g., Record: 1-10,000, is visible in the record field.

The consumer and/or business information displayed in work area 434 may be selected for review in one or more customer fields 412. The data displayed may be selectively saved, deleted, or appended, for example, by selecting one or more check boxes adjacent to its corresponding customer fields 412. The data in the selected customer fields 412 may be saved by selecting the "Save" 436 or "Save As" 438 button, appended by selecting the "Append" 440 button, or selectively or completely deleted by selecting the "Delete Current" 442 or "Delete All" 444 button. In addition, the database generated from record set 410 may be attached to an existing database by selecting the "DB ATTACH" button 446, may be saved as a new database by selecting the "Save As" button 448, or may be cleared by selecting the "Clear DB" button 450.

In addition, in FIG. 4, a user may control the browser speed and the retrieval speed. Browser speed control 452 may be adjusted using "−" and "+" buttons 454, 456; and grab speed control 458 may be adjusted using "−" and "+" buttons 460, 462. Furthermore, the browser speed may vary in a range from its set browser speed, e.g., 5000 ms, to another user-entered speed, e.g., 7 seconds 464 when the adjacent check box 466 is selected. This function is described further below.

Figure 8:
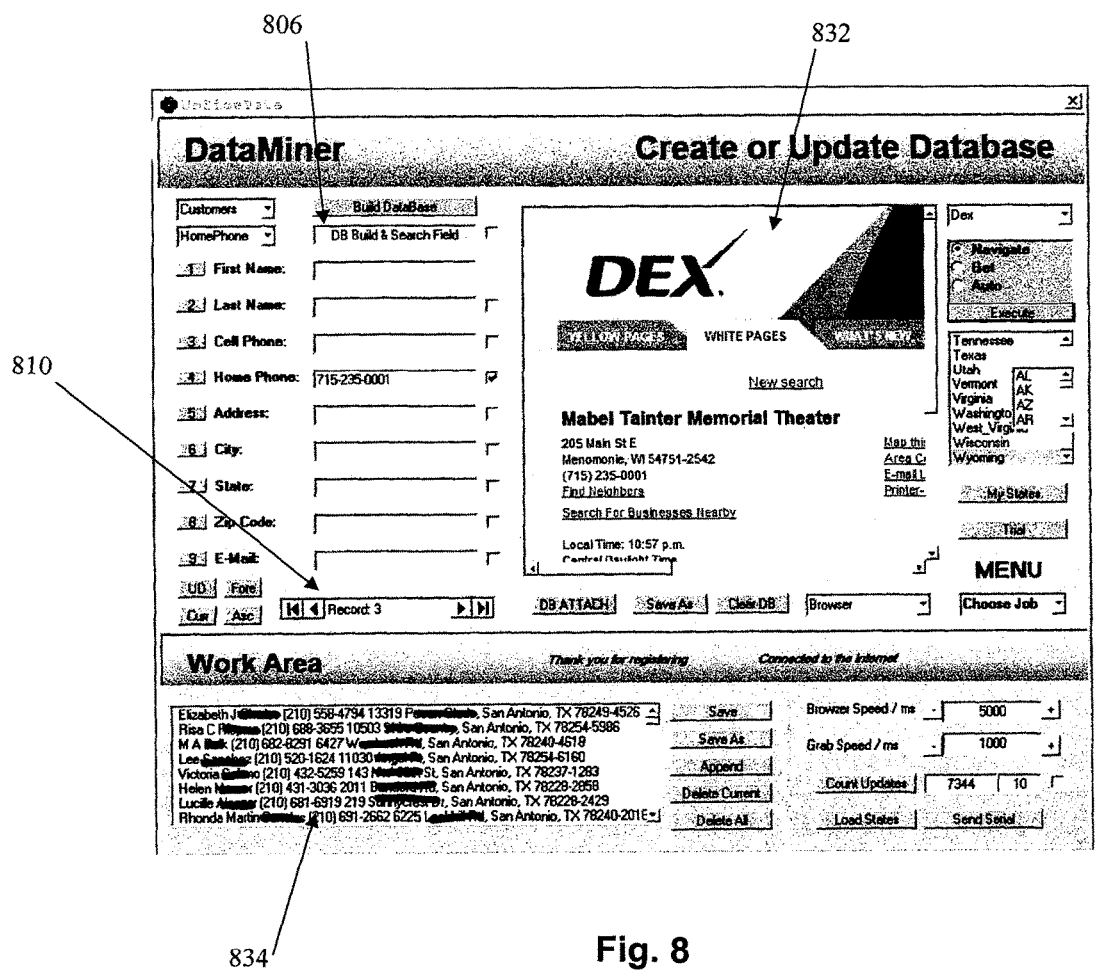
FIG. 8 depicts a screenshot of another database creation page.

FIG. 8 depicts a screenshot of a user interface similar to that of FIG. 4, and provides a further example of a type of common criteria, i.e., a zip code search string of zzz-, where "z" is a zip code character 0-9 or A-Z. In FIG. 8, the zip code prefix "728" is entered in field 806 and record set 810 is generated, e.g., a set of 100 records, 72800-72899. Subsequently, each record in the set may be searched using an Internet search engine displayed in window 832, and the retrieved results may be displayed in work area 834. Alternatively, when a zip code search string of zzzzz- is entered in field 806, record set 810 of 10,000 records may be generated, e.g., a record for each zip code zzzzz-ssss, where "s" is a zip code suffix corresponding to a potential address. It will be understood that other types of record sets may be created according to certain implementations of the invention and may include record sets for phone numbers, addresses, county codes, country codes, etc., which may be associated with consumers and/or businesses.

Search Randomizer

The present invention conducts timed searches of a set of data. According to the implementation described in FIG. 4, the time between each record searched may be set by entering a value in browser speed field 452, or may be adjusted by selecting the "−" or "+" buttons, 454, 456. In addition to setting the browser speed, the present invention may conduct randomized timed searches. That is, the browser speed between executing one search to executing the next search may be set to occur after random time increments. The search randomizer function provides advantages over search systems that search at the same browser speed because some Internet databases use virus detection software or search blocking processes that correlate searches occurring within identical periods of time with a worm or virus and block the source of the search.

In FIG. 4, a user may enter a timed end point in time field 464, e.g., 7 seconds, and the times in the browser speed field 452, e.g., 5000, and time field 464 are the end points for a range of times the browser will wait between searches, e.g. between 5000 ms and 7000 ms. The beginning and end point may be adjusted to a desired number, and the randomness of the time between searches may be to the millisecond. Accordingly, any increment falling within the range may be randomly selected by the search randomizer function in the automated query and retrieval process.

Database Management

Figure 5:
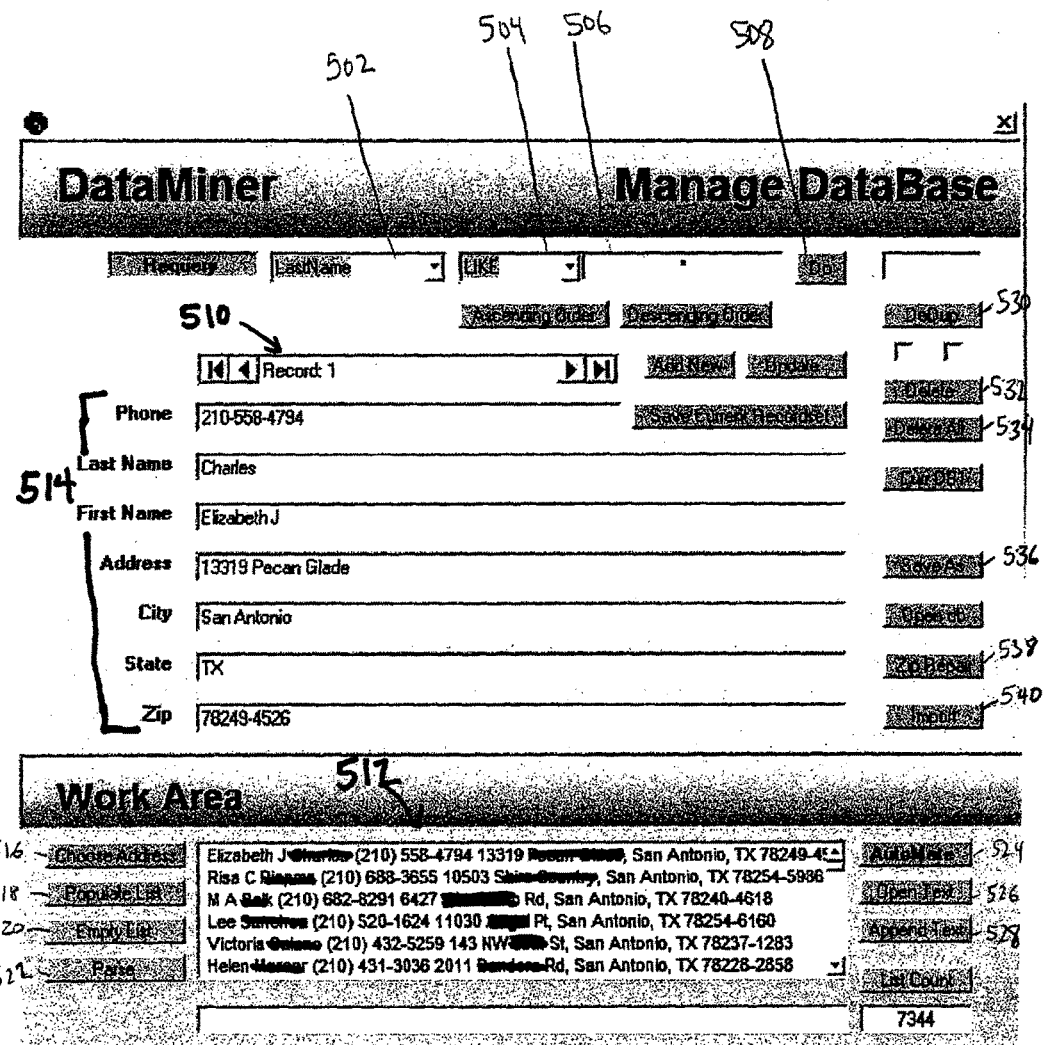
FIG. 5 depicts a screenshot of a screenshot of a database management tool.

FIG. 5 is a screenshot of a database management tool that may cooperate with the database creation page, e.g., FIG. 4, by presenting the data from the database generated in a format that enables a user to search/query, organize, supplement, update, delete, save, repair and/or import the database data. According to FIG. 5, a user may query data by (1) selecting a data type from pull down menu 502, e.g., last name, first name, address, etc., (2) selecting an operator from pull down menu 504, e.g., like, =, excluding, >, < >, <, or another common search operator, (3) entering search criteria in field 506, e.g., *smith* for a last name having "smith" therein, and (4) selecting "Do" button 508. A user may navigate through the collected records from the query by selecting arrow buttons on record field 510. Data corresponding to the selected record may be reviewed in work area 512 and in the appropriate consumer/business address fields 514, allowing for the management of address and consumer data.

In work area 512, selecting "Populate List" button 518 populates work area 512, selecting "Empty List" button 520 removes data from work area 512, and selecting "Choose Address" button 516 highlights a particular address in work area 512. Once an address is selected, choosing "Parse" button 522 results in populating the selected data in the appropriate business/address fields 514.

Selecting "AutoMate" button 524 automatically enters the set of data into a database. Selecting "Open Text" button 526 opens a text file the collected saved names, and selecting "Append Text" button 528 appends the opened text file to another file.

Once consumer/business address data is displayed in the appropriate fields 514, the data may be manipulated using one or more manipulation buttons. For example, data that is duplicative may be removed by selecting "DeDup" button 530 (described further below). In populated fields 514, all or a portion of the data presented may be deleted by selecting the "Delete" button 532 or "Delete All" button 534, or data may be saved by selecting the "Save As" 536 button. Selecting "Zip Repair" button 538 (described further below) fixes missing or improper zip codes. "Import" button 540 imports data from a set of collected data.

Duplicate Removal

Data retrieved using processes of the present invention may be duplicative of pre-existing data. Therefore, when appending retrieved data to an existing database, it may be desirable to avoid duplicate entries. According to implementations of the invention, a duplicate removal process may be initiated by selecting the "DeDup" button 530 from FIG. 5, which removes duplicate entries in a database. All or a portion of the retrieved data may be compared against existing data for purposes of duplicate removal. For example, a last name and a phone number for retrieved data may be compared with the preexisting last name and phone number data. Where a duplicate is identified, the retrieved data is not appended to the list.

According to one duplicate removal process, while data is appended to an existing database, each new entry is checked against an existing set of data to determine whether the new entry is a duplicate, and if so, the duplicate is deleted. When the duplicate removal process does not detect a duplicate, the new record is appended to the existing memory.

In a further duplicate removal process, the set of data retrieved may be compared to the same set of retrieved data to identify duplicate entries. For example, where an address is associated with multiple phone numbers, the duplicate removal process may compare a last name and street address with the rest of the retrieved data to identify duplicates. The above duplicate removal processes provides advantages for a user intending to generate a potential customer list because sending multiple mailings to an individual or calling one address multiple times may be avoided.

Zip Code Repair

Some consumer, location or business data that may be collected using Internet search engines may have missing, erroneous, or incomplete zip code data. In order to provide a complete record for mail merge purposes, the correct zip code for each record is required. Accordingly, selecting "Zip Repair" button 538 in FIG. 5, initiates a zip code repair process that compares the street address and city provided in address fields 514 with current post office zip code information. Because the entire address for a record is used for comparison as opposed to just the city, the correct zip code is identified for cities having multiple associated zip codes.

Removal of Records Based on Comparison Lists

Some consumer data retrieved using the methods of the present invention may correspond to consumer(s) listed on a "do not call" list or a "do not mail" list. In certain embodiments, therefore, consumer records retrieved may be cross-referenced with a compiled list of consumers that prohibit advertising mailing and/or prefer not to receive sales calls, and consumer data matching the lists may be removed from the set of search results. Some publicly available "do not call" lists are available through the U.S. government via a national registry or through a particular state via a state registry. In addition, some publicly available "do not mail" lists are available over the Internet and may provide a national, state or local list of consumers that do not wish to receive mail from direct mail marketing campaigns. Thus, according to FIG. 1, once a set of data is retrieved (130), user preferences may dictate the format the data is provided (140), which may include providing only data that has been filtered through a "do not call" list and/or a "do not mail" list. Alternatively, after data is provided (140) to a user, the user may select to filter the data using one or more of the above-described lists.

Data Importing and Appending

Figure 6:
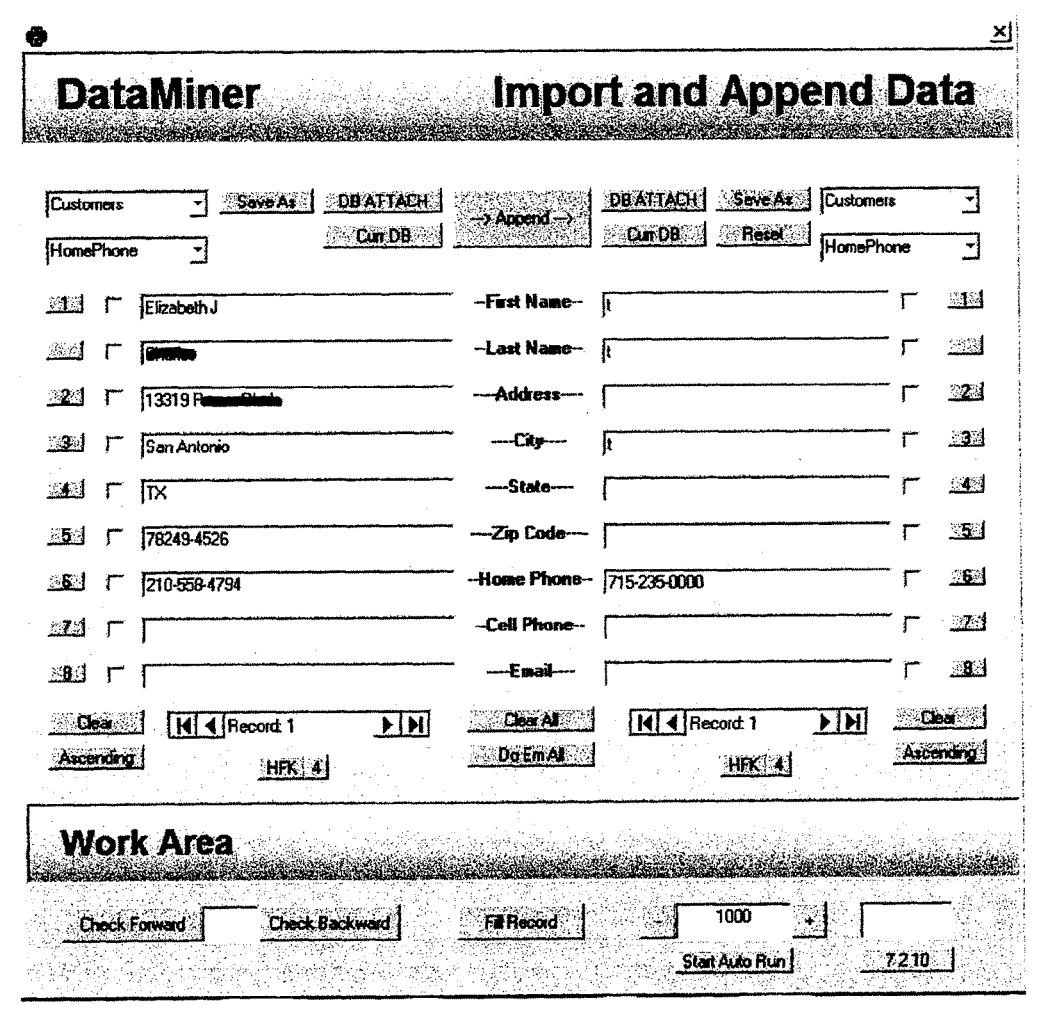

FIG. 6 is a screenshot of an import and append data tool configured to cooperate with the database creation page, e.g., FIG. 4, by presenting the data from the database generated in a format that enables a user to add collected data to an existing database.

Field Name Compatibility

According to certain implementations, once a set of records in a dataset are searched and a set of data retrieved, the resulting set of data may be saved and/or appended to another set of database data, e.g., saved into another preexisting database. According to certain implementations, such as the implementation of FIG. 6, appending data to another database is simplified compared to other database systems because the set of retrieved data may have field names, e.g., first name field, last name field, address field, etc., different from the field names in an existing database. For example, retrieved data may have a field entitled: first name, while the existing database to which the retrieved data is to be appended may have a corresponding field name entitled: f. name. Accordingly, the embodiments of the present invention allow the data to be grouped together regardless of the identity of field names and without the need to change field names.

Furthermore, saved and/or appended data may be manipulated using extended database capabilities in order to provide records in a desired format (e.g., for use in a spreadsheet), with a desired type of information, and/or in a desired form (e.g., data may be manipulated to provide a user with partial records as opposed to the complete record saved and/or appended)

Licensing Capacity

Figure 7:
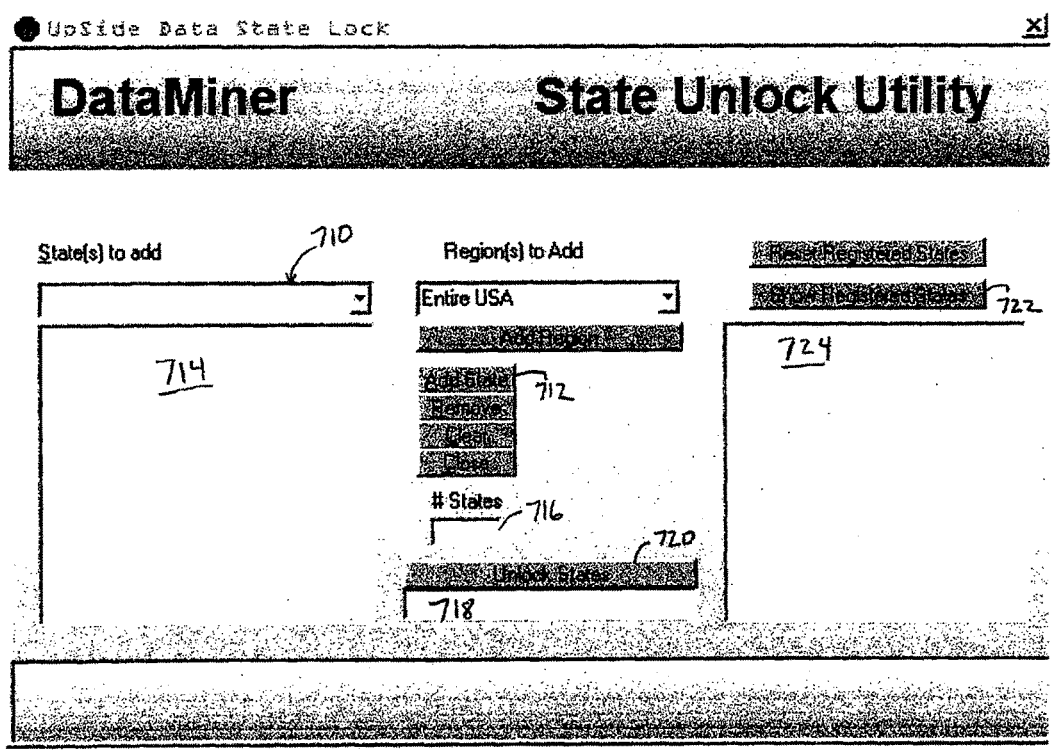
FIG. 7 depicts a screenshot of a state unlock utility.

Implementations of the invention allow a user to search consumers, locations and/or businesses based on common criteria, and thus may provide advantages in marketing contexts. Accordingly, the text mining methods of the present invention may be provided by licensing software to users according to the criteria desired to be searched. For example, licenses may be provided for generating data sets on a national, state, area code, phone number prefix, city, and/or zip code basis. FIG. 7 depicts a screenshot of licensing software by state, which may be implemented with the reverse phone number lookup software described above in relation to FIGS. 4-6. In FIG. 7, one or more states are selected from the "State(s) to add" pull down menu 710. Each time a state is selected, the "Add State" button 712 is selected and the state appears in window 714 below the "State(s) to add" pull down menu 710. The total number of states selected appears in the # States box 716, and one or more unlock codes is provided in the field 718 below the "Unlock States" button 720. Once registered, a user may select the "Show Registered States" button 722, and the states are provided in box 724 on the right side of the screenshot. Although FIG. 7 depicts a state unlock screen, it will be understood that software may allow a user to unlock a variety of search types contemplated. For example, one or more partial search strings, e.g., common criteria for a search, may be unlocked for a 10-digit land parcel IDs, zip codes, phone numbers, MLS numbers, etc.

Encryption Software

Embodiments of the present invention that implement licensing applications with the search software may also implement encryption software. This may be desirable where unlocking software for a particular search capability provides limited searching for the user, which cannot be unlocked further without proper access codes. Companies that sell or install software may have their own customized encryption software. Accordingly, as an alternative to providing encryption software with the software and/or hardware of the present invention, the software and/or hardware may allow another's encryption program to be plugged-in.

It will be understood that various APIs may be implemented according to the present invention, each of which may search a set of data having common criteria. The illustrations provided in FIGS. 4-8 should not be construed as limiting the processes or appearance of the APIs.

Figure 9:
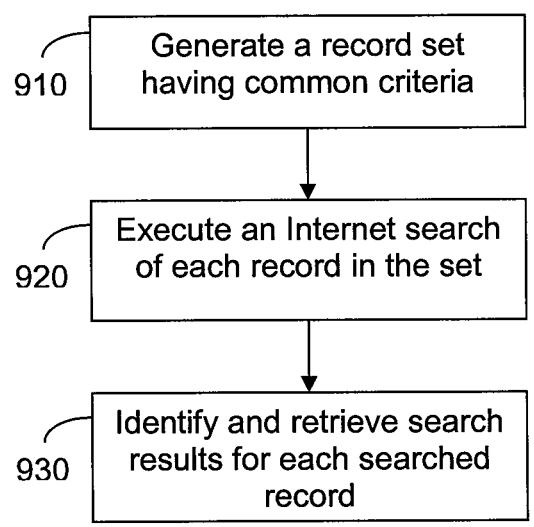
FIG. 9 depicts a flowchart of processes implemented by an application programming interface.

To illustrate one such various implementation, FIG. 9 is a flowchart of an API process that generates 910 a record set of search criteria where each record in the set includes a portion of common criteria, automatically executes 920 in a searchable Internet database a search of each record in the record set, and identify and retrieves 930 search results for each record searched.

Figure 10:
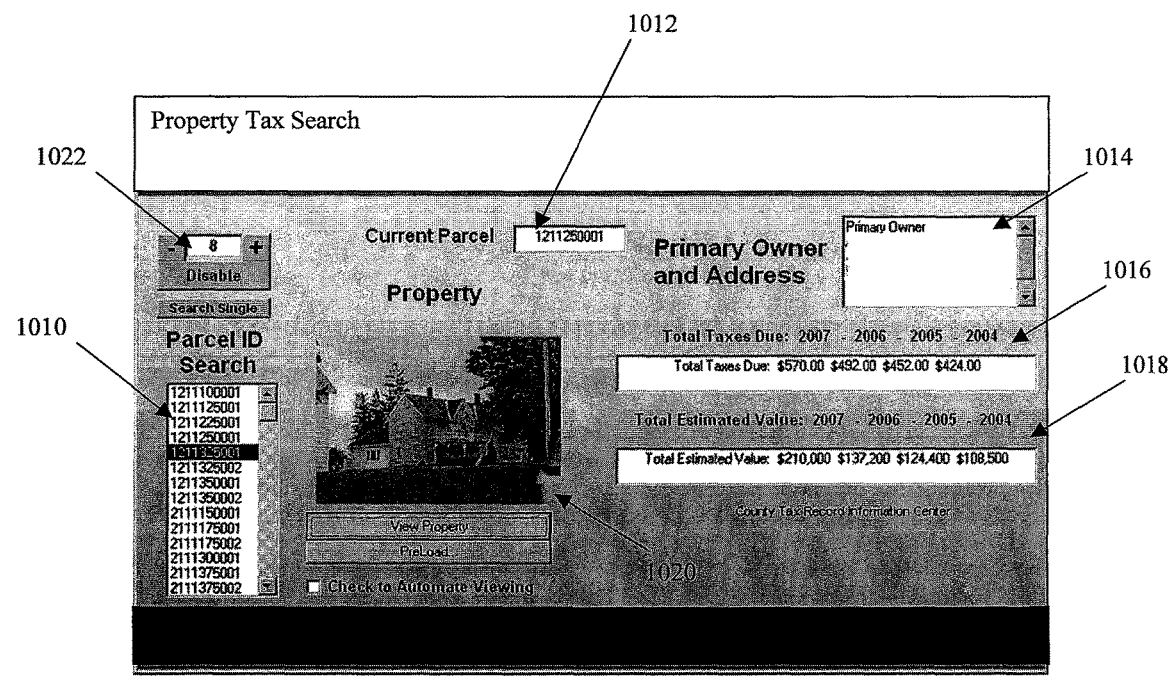
FIG. 10 depicts a screenshot of a property tax data search by land parcel ID.

Furthermore, an API may be configured for a number of types of common search criteria. FIG. 10 depicts a screenshot of an API that is associated with hardware or software configured to search, in a city, county or state-based database, a set of land parcel IDs each having the common search criteria of "211". That is, each land parcel ID to be searched includes "211" somewhere in the 10-digit number. List box 1010 depicts a listing of a series of land parcel IDs each having "211" therein. The API is configured to access publicly available property tax records by entering a land parcel ID as the search criteria. Each time the 10-digit number corresponds to a land parcel ID, the API retrieves associated address, tax, and image data. In FIG. 9, land parcel ID 1211250001 is listed in "Current Parcel" field 1012 as the current parcel searched, and the results of the search are provided in the "Primary Owner and Address" field 1014, in the "Total Taxes Due" field 1016, and in the "Total Estimated Value" field 1018. Furthermore, an image of the property searched may be displayed in "Property" display box 1020. Thus, for example, once the time between searches is entered in field 1022, e.g., 0.1-40, a computer application and/or hardware may initiate the method depicted in FIGS. 1, 9, or combinations and variations thereof.

In a further embodiment, search criteria may include full or partial land coordinates, map coordinates, and/or GPS coordinates. Another type of search criteria may include common location criteria in combination with a particular demographic. For example, males between 25-49 within a 10-mile radius of a location, e.g., a stadium, town center, school, and/or business, may be queried, identified, retrieved, and presented according to some implementations. Thus, it will be understood the systems and methods of the present invention may be used to provide a degree of completeness to a record that otherwise is missing desirable data.

The method and system according to the present invention may be implemented using various combinations of software and hardware as would be apparent to those of skill in the art and as desired by the user. The present invention may be implemented in conjunction with a general purpose or dedicated computer system having a processor and memory components.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

What is claimed is:

1. A method of generating database records comprising:
receiving by a processor, a first user input defining a common search criteria;
adjusting a browser speed in response to a second user input the browser speed comprising a range of times the browser will wait between successive searches of a searchable Internet database, wherein a time period between each successive search is associated with a random time increment;
adjusting a timed end point in response to a third user input the timed end point comprising a total search time comprised of a plurality of randomized timed searches;
initiating the plurality of randomized timed searches of the searchable Internet database for the common search criteria;
identifying, by the processor, one or more database records in the searchable Internet database, wherein each of the one or more records is associated with the common search criteria; and
extracting by the processor, the one or more database records from the searchable Internet database to build a set of extracted records, wherein the extracted records are in a different format from the database records;
comparing by the processor the one or more database records with a second searchable database; and
correcting by the processor at least one of the one or more extracted records in the set of database records based on information stored in the second searchable database.

2. The method of claim 1, wherein each of the one or more database records is associated with additional data related to the common search criteria.

3. The method of claim 2, wherein extracting the one or more database records comprises extracting the common search criteria and the additional data.

4. The method of claim 1, further comprising: extracting by the processor additional data from the second searchable database related to at least one of the one or more database records; and associating by the processor the additional data with the at least one of the one or more extracted records in the set of database records.

5. The method of claim 1, wherein the common search criteria is identifiable in the searchable Internet database in one of a plurality of predefined formats.

6. The method of claim 1, further comprising modifying at least a portion of the one or more extracted records to a specified format.

7. The method of claim 6, wherein the portion comprises a mailing address.

8. The method of claim 1, wherein each of the one or more extracted records includes a first plurality of data field names.

9. The method of claim 8, further comprising:
appending by the processor the one or more extracted records to a second set of database records, wherein the second set of database records includes a second plurality of data field names, and the second plurality of data field names is different from the first plurality of data field names.

10. A method of conducting timed searches of data comprising:
adjusting a browser speed in response to a first user input received at a user interface, the browser speed comprising a range of times the browser will wait between successive searches of a searchable Internet database, wherein a time period between each successive search is associated with a random time increment;
adjusting a timed end point in response to a second user input received at the user interface, the timed end point comprising a total search time comprised of a plurality of randomized searches;
executing, by a processor, a first timed search of a set of records having common search criteria;
executing, by the processor, a second timed search of the set of records;
wherein the time period between the first timed search and the second timed search is randomly selected;
retrieving information associated with the searched plurality of records; and
providing the retrieved information in a specified format;
comparing by the processor the one or more database records with a second searchable database; and
correcting by the processor at least one of the one or more extracted records in the set of database records based on information stored in the second searchable database.

11. A method of removing duplicate entries from a database comprising:
generating a database having a set of records, wherein a first portion of each record comprises a common criteria data within the set of records to be searched and a second portion of each record is generated based on the common criteria data;
appending a new record to the set of records, the new record comprising the first portion comprising the common criteria data and a third portion generated based on the common criteria data; and
comparing the new record to each record in the set of records to determine whether the third portion of the new record matches the second portion of a record in the set of records,
wherein generating a database having a set of records and appending a new record to the set of records comprises:
adjusting a browser speed in response to a user input the browser speed comprising a range of times the browser will wait between successive searches or a searchable Internet database, wherein a time period between each successive search is associated with a random time increment;
adjusting a timed end point in response to a second user input the timed end point comprising a total search time comprised of a plurality of randomized timed searches;
initiating the plurality of randomized timed searches of the searchable Internet database for the common criteria data;
identifying the set of records and the new record in the searchable Internet database;
extracting the set of records and the new record from the searchable Internet database;
comparing by the processor the one or more database records with a second searchable database; and
correcting by the processor at least one of the one or more extracted records in the set of database records based on information stored in the second searchable database.

12. The method of claim 11, further comprising:
responsive to determining that the third portion of the new record matches the second portion of a record in the set of records, removing the new record from the database.

13. The method of claim 11, further comprising:
responsive to determining that the third portion of the new record does not match the second portion of a record in the set of records, appending the new record to the set of records in the database.

* * * * *